(12) United States Patent
Golecki

(10) Patent No.: US 6,800,828 B2
(45) Date of Patent: Oct. 5, 2004

(54) ELECTRICAL DISCHARGE MACHINING OF CARBON-CONTAINING WORK PIECES

(75) Inventor: Ilan Golecki, Parsippany, NJ (US)

(73) Assignee: Honeywell International Inc., Morristown, NJ (US)

( * ) Notice: Subject to any disclaimer, the term of this patent is extended or adjusted under 35 U.S.C. 154(b) by 131 days.

(21) Appl. No.: 09/823,622

(22) Filed: Mar. 31, 2001

(65) Prior Publication Data

US 2002/0139677 A1 Oct. 3, 2002

(51) Int. Cl.$^7$ .............................. B23H 5/00; B32B 3/12; C25B 11/00; H01M 2/00
(52) U.S. Cl. .............................. 219/69.17; 219/69.15; 428/116; 428/131; 428/408; 204/280; 204/284; 429/34
(58) Field of Search .......................... 219/69.15, 69.17; 204/290.01, 294, 284, 280; 429/34–39; 428/408, 116, 131; 420/137

(56) References Cited

U.S. PATENT DOCUMENTS

| | | | | |
|---|---|---|---|---|
| 4,132,038 A | * | 1/1979 | O'Connor et al. | ........ 219/69 V |
| 4,163,701 A | | 8/1979 | Schepacz | |
| 4,459,453 A | * | 7/1984 | Inoue | ........ 219/69 M |
| 4,505,992 A | * | 3/1985 | Dettling et al. | ........ 429/36 |
| 4,549,061 A | * | 10/1985 | Nicholas et al. | ........ 219/69 G |
| 4,673,787 A | * | 6/1987 | Inoue | ........ 219/69 W |
| 4,692,418 A | | 9/1987 | Boecker et al. | ........ 501/90 |
| 4,732,660 A | * | 3/1988 | Plowman et al. | ........ 204/265 |
| 4,929,505 A | * | 5/1990 | Washburn et al. | ........ 428/137 X |
| 5,242,555 A | | 9/1993 | Bühler | |
| 5,413,738 A | | 5/1995 | Lewis et al. | |
| 5,448,883 A | | 9/1995 | Meserole, Jr. et al. | |
| 5,548,953 A | | 8/1996 | Hedges et al. | |
| 5,650,059 A | | 7/1997 | Shumaker et al. | |
| 5,702,586 A | | 12/1997 | Pehrsson et al. | |
| 5,837,957 A | | 11/1998 | Sato et al. | ........ 219/69.15 |
| 6,013,371 A | | 1/2000 | Hager et al. | ........ 428/408 |
| 6,397,581 B1 | * | 6/2002 | Vidal et al. | ........ 428/408 X |

FOREIGN PATENT DOCUMENTS

GB          1149047          4/1969

OTHER PUBLICATIONS

H. Hocheng, Y.H. Guu and N.H. Tai, "The feasibility analysis of electrical discharge machining of Carbon–Carbon composites", Materials and Manufacturing Processes, vol. 13, No. 1, pp. 117–132 (1998), (no month).

* cited by examiner

Primary Examiner—Donald R Valentine
(74) Attorney, Agent, or Firm—Oral Caglar, Esq.

(57) ABSTRACT

Complex features and fine details in a Carbon—Carbon work piece, for example, are formed by electrical discharge machining (EDM). An electrode used in the EDM is made of a material that is mechanically and chemically compatible with Carbon—Carbon composite material.

14 Claims, 3 Drawing Sheets

ELECTRICAL DISCHARGE MACHINING OF CARBON-CONTAINING WORK PIECES

BACKGROUND

The present invention relates to a method of forming complex features and fine details in work pieces made of Carbon—Carbon composite material and other carbon-containing materials. The present invention also relates to heat exchangers and fuel cells.

Carbon—Carbon composite materials are used in certain heat exchangers. Consider a Carbon—Carbon plate-fin heat exchanger core including a stack of plates and fins. The plates may be made from flat thin-gauge two-dimensional Carbon—Carbon woven fabrics, and the fins may be made from thin-gauge two-dimensional Carbon—Carbon woven fabrics that are corrugated. Thickness of the plates and fins may range between 0.1 millimeters and 1 millimeter.

Fabricating the Carbon—Carbon fins is difficult. The fins define long, narrow channels that function as fluid passageways. Shapes are complex. Creating a high density of fins (i.e., x number of fins per linear inch) is even more difficult. Yet it is extremely desirable to increase the fin density. Increasing the fin density increases the heat transfer capability.

Carbon—Carbon composite materials are used in certain fuel cells. Carbon—Carbon bipolar plates of proton exchange membrane fuel cells are typically flat, have a thickness of 0.2–1 millimeters and, in addition, have intricately shaped, fine-featured flow fields for channeling the flow of the hydrogen and oxygen gases used in the operation of the fuel cells. These flow fields typically have features of sub-millimeter dimensions. Forming such fine details is extremely difficult.

SUMMARY

Complex shapes and fine details in a carbon-containing work piece are formed by electrical discharge machining. An electrode used in the machining is made of a material that is mechanically and chemically compatible with the carbon-containing work piece.

DETAILED DESCRIPTION

Figure 1A:
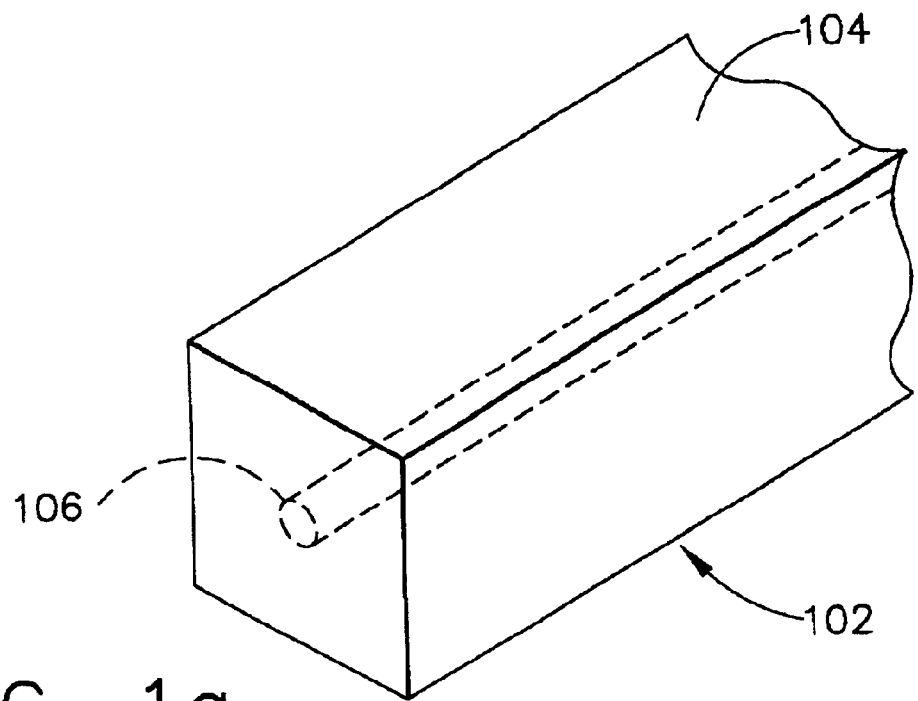
FIGS. 1a and 1b are illustrations of electrodes for machining a Carbon—Carbon work piece.

Fine details and complex features in a work piece made of Carbon—Carbon composite material are formed by electrical discharge machining (EDM). The EDM is used to remove portions of the Carbon—Carbon work piece by spark erosion. In EDM, a wire electrode is brought in close proximity to the work piece, which constitutes a second electrode. An electrical current pulse is generated between the wire electrode and the work piece. Currents may be in the range of 0.1 amps to 100 amps, and voltages may be in the range of 1 volt to 100 volts. The current is pulsed, with pulse duration being in the range of 1 microsecond to 1000 microseconds. The electrical pulses result in a concentrated amount of energy being deposited in the region of the work piece under the wire electrode, which results in heating and vaporization removal of Carbon—Carbon composite material from the work piece.

During EDM, material from the wire electrode is transferred to the work piece, and material from the work piece is transferred to the wire electrode. Typically, the erosion rate from the work piece will be greater than that of the wire electrode.

If the wire electrode is made of a metal such as copper, metal is transferred to the work piece. The metal reduces the strength of the Carbon—Carbon composite. Oxidation of carbon during use of the machined work piece is accelerated due to the catalytic effect of free metal. The metal also increases the density and reduces the thermal conductivity of the work piece, and it might also alter the thermal expansion coefficient of the work piece. In heat exchangers all of these effects are undesirable.

If, however, the electrode is made of a material that is mechanically and chemically compatible with the Carbon—Carbon work piece, these problems do not arise. For example, a graphite electrode, a carbon or carbide electrode, a tungsten electrode, or a carbide-coated metal electrode is mechanically and chemically compatible with Carbon—Carbon. Specifically, if material is transferred from such a compatible electrode to the Carbon—Carbon work piece, the material is carbon or carbon-based, or it readily forms a carbide and, therefore, is either the same or similar to the carbon in the work piece. Further, there is no free metal in the Carbon—Carbon work piece, which is desirable in order to suppress the accelerated oxidation of carbon (during use of the machined work piece) due to the catalytic effect of the free metal.

During EDM, an oxidizing dielectric such as water (either as a liquid, initially, or a vapor) or an oxidizing gas (e.g., air) is supplied to the work piece. The advantage of such oxidizing dielectrics is in causing local oxidation of the carbon in the region heated by the electrical current pulse and thus causing enhanced local erosion and reduced machining time.

Depending upon the specific EDM conditions and requirements of the work piece, the gas may be a hydrocarbon, for example, methane ($CH_4$). Dissociation products of the hydrocarbon are hydrogen and carbon, which is compatible with carbon in the work piece. An inert gas such as argon or nitrogen may be used instead.

The Carbon—Carbon work piece may be machined at any stage of its formation. During formation, the work piece is started as one or more weaves of carbon fibers. The fibers are impregnated with a resin and cured. The cured work piece is pyrolized to form a carbon matrix. The pyrolized work piece is densified by depositing additional carbon, and the densified work piece is annealed to graphitize the additional carbon.

Dimensions of the wire electrode will depend upon the details to be machined and the composition of the electrode. A wire electrode can be fabricated by machining or another process (e.g., extrusion, sinter compression). An electrode having a non-standard cross-section (e.g., a square cross-section) may also be fabricated by machining or another process. Carbon—Carbon work pieces may be machined to very fine dimensions and complex shapes by any of the following examples.

EXAMPLE 1

An electrode of small diameter (e.g., 0.1 mm) is scanned over the work piece using a programmable X-Y-Z stage.

EXAMPLE 2

An array of electrodes having very small diameters (e.g., diameters of 0.1 mm or less) are scanned as a group or individually and are fired (discharged) as a group or individually over the work piece.

EXAMPLE 3

An electrode has the shape of a negative replica (that is, the shape of the portion to be removed from the work piece). Such an electrode may be held in place and discharged repeatedly in place until the desired shape has been formed in the work piece. To create greater depth, the electrode may be moved stepwise in the z-direction and repeatedly discharged in place at each step.

FIG. 1a shows an elongated electrode 102 including a body 104 having a square cross-section. The body 104 may be made of a material that is mechanically and chemically compatible with Carbon—Carbon composite material. In the alternative, the body 104 may have a metal core and an outer coating, the outer coating made of a material that is mechanically and chemically compatible with Carbon—Carbon composite material.

A fluid passageway 106 extends through the body 104. Dielectric is supplied to the work piece via the passageway 106 during EDM. The dielectric also cools the electrode 102 during EDM.

Figure 1B:
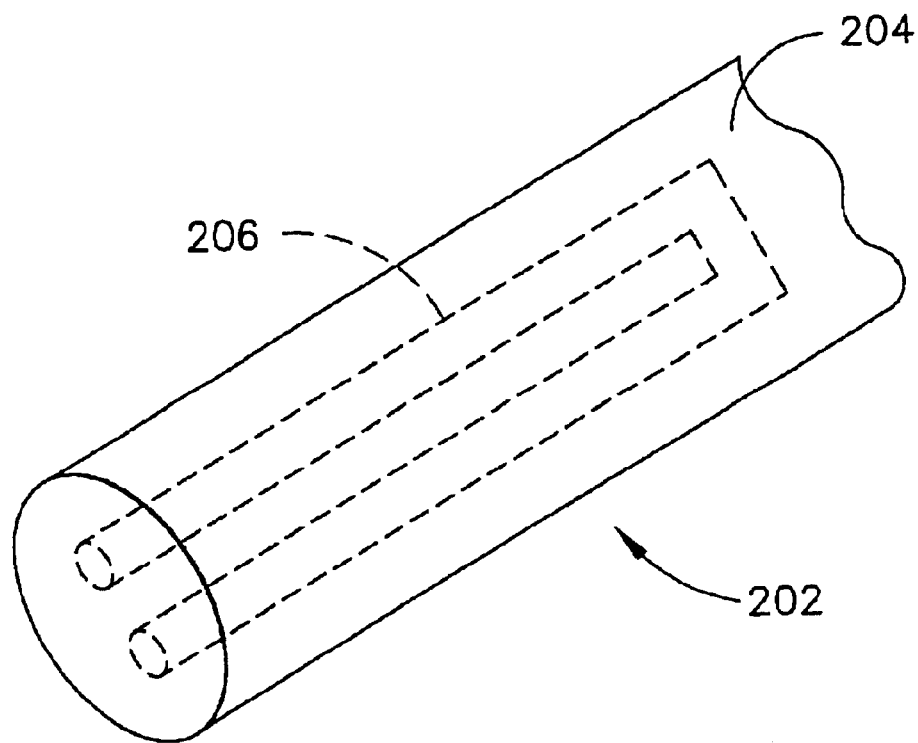

FIG. 1b shows an elongated electrode 202 including a body 204 having a circular cross-section. An enclosed passageway 206 extends into the body 204. For the electrode 202 shown in FIG. 1b, the passageway 206 does not extend entirely through the body 204; therefore, fluid flowing through the passageway 206 only cools the body 204.

Figure 2:
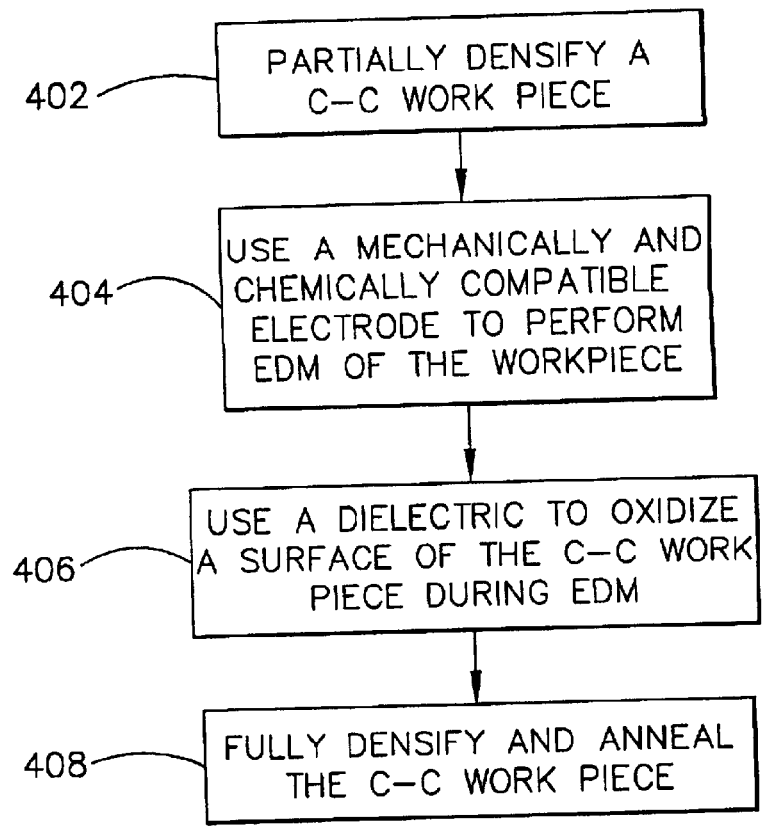
FIG. 2 is an illustration of a method of machining a Carbon—Carbon work piece for a heat exchanger.
Figure 3:
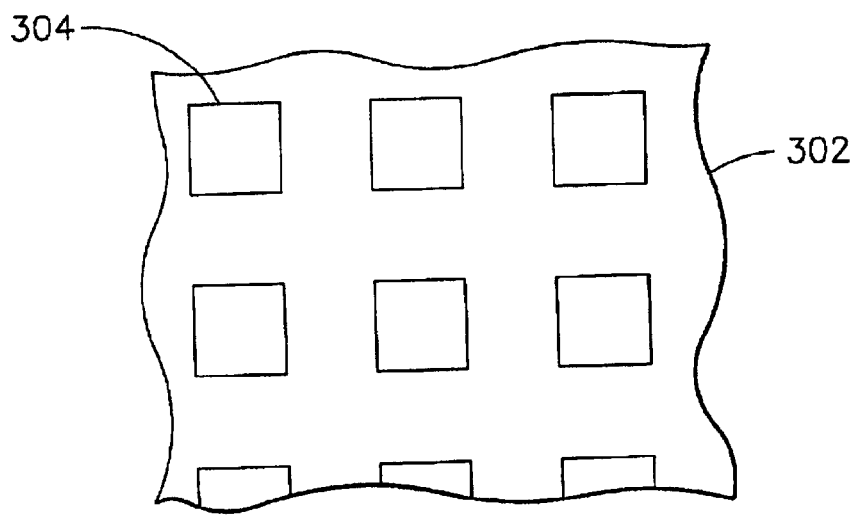
FIG. 3 is a cross-sectional view of a Carbon—Carbon work piece that was machined by electrical discharge machining.

FIG. 2 shows an exemplary method of machining a core for a heat exchanger. A Carbon—Carbon work piece 302 (see FIG. 3) is partially densified (block 402), and an array of electrodes is used to machine (block 404) fluid passageways 304 in the work piece 302. Each electrode may have the shape of a negative replica of a fluid passageway. During machining, the electrodes are moved stepwise in the z-direction to extend the fluid passageways from one side of the work piece to an opposite side.

During machining, a water or gas dielectric is used to oxidize the surface of the work piece (block 406). After the fluid passageways have been machined, the work piece is fully densified and annealed (block 408).

Because the EDM can form details having sub-millimeter dimensions, a high density of passageways can be formed. Because fluid passageways are machined into the work piece, the steps of forming separate plates and spacers and bonding together the plates and spacers are eliminated. Because fluid passageways are formed without bonding plates and spacers together, mechanical integrity and leak-tightness of the heat exchanger are improved.

An elongated electrode having a circular cross-section may be used to form Carbon—Carbon bipolar plates of proton exchange membrane fuel cells. These plates are typically flat, have a thickness of 0.2–1 millimeters and, in addition, have intricately shaped, fine-featured flow fields for channeling the flow of the hydrogen and oxygen gases used in the operation of the fuel cells. The flow fields have features of sub-millimeter dimensions.

Figure 4:
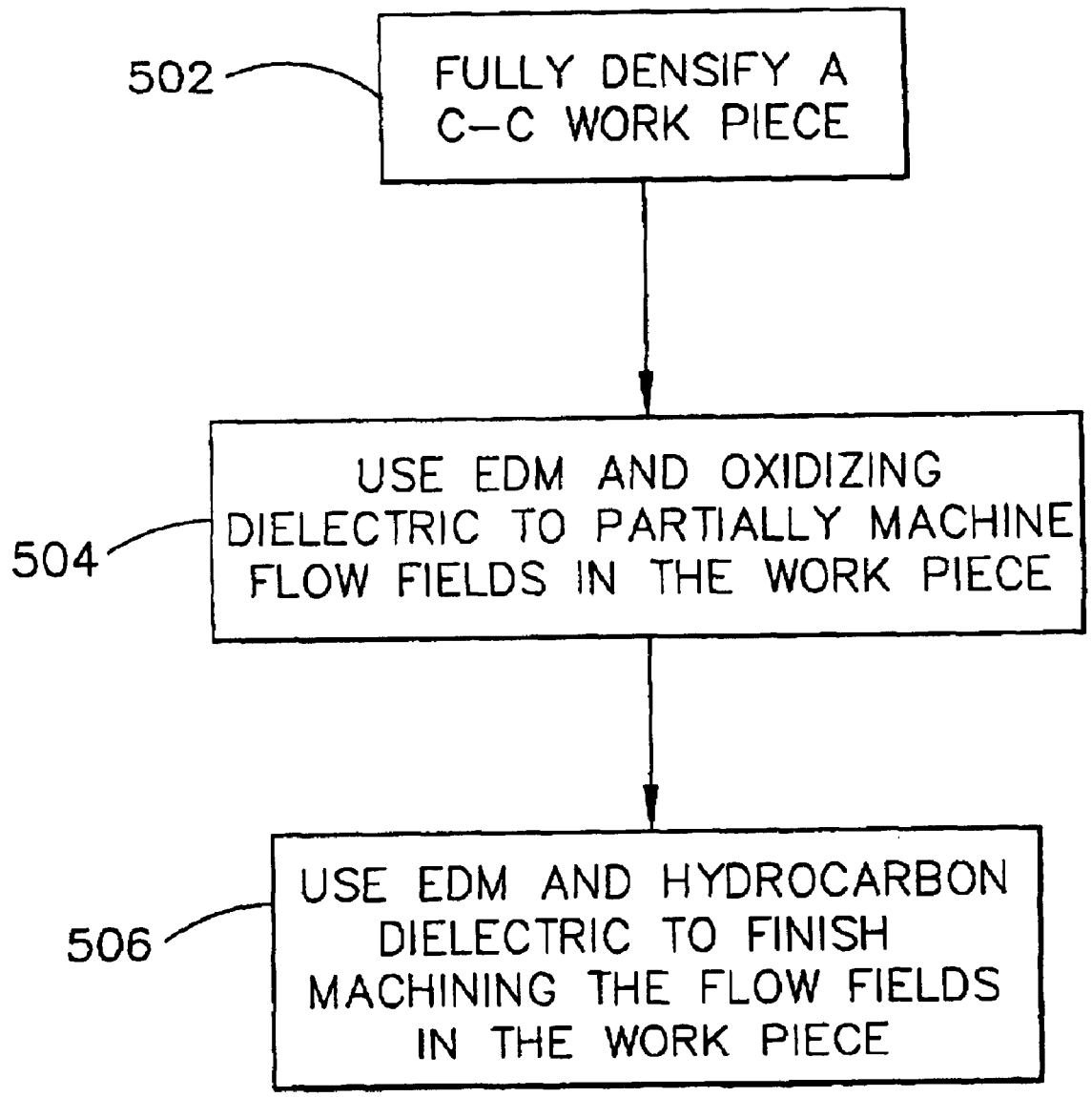
FIG. 4 is an illustration of a method of machining a Carbon—Carbon work piece for a proton exchange membrane fuel cell.

FIG. 4 shows an exemplary method of fabricating a bipolar plate for a proton exchange membrane fuel cell. A Carbon—Carbon work piece is fully densified (block 502), and a single electrode or an array of electrodes is used to machine flow fields in the work piece. EDM of the work piece is started during a first stage (block 504) and finished during a second stage (block 506). During the first stage of EDM, an oxidizing dielectric is used.

The EDM during the first stage can create pores in the fully densified work piece. If the work piece is not repaired, these pores can form leakage paths in the bipolar plate.

The work piece is repaired by using a hydrocarbon dielectric fluid (e.g., methane, cyclopentane, hexane) instead of an oxidizing dielectric during the second stage of EDM. During EDM the temperature of the hydrocarbon dielectric fluid reaches or exceeds pyrolysis temperatures, whereby carbon from the fluid is deposited on the work piece and fills the pores. Thus the work piece is repaired in-situ.

Because the EDM as described repairs the work piece in-situ, the chance of in-use gas leakage is reduced. Moreover, an additional step of applying a final CVD carbon coating to the fully machined work piece is eliminated.

EDM may be used to form complex shapes and fine dimensions between 0.1–1 millimeters in a variety of other Carbon—Carbon structures. Structures include heat spreaders for infrared suppressors and lightweight honeycombs for satellites.

The invention is not limited to Carbon—Carbon work pieces. Other carbon-based work piece materials may be used, provided that the wire electrode is chemically and mechanically compatible with the carbon-based work piece.

Although the present invention has been described above with reference to specific embodiments, it is not so limited. Instead, the present invention is construed according to the claims that follow.

What is claimed is:

1. A Carbon—Carbon heat exchanger core comprising a 2-D array of machined fluid passageways extending through the heat exchanger core, the fluid passageways having dimensions between 0.1 millimeters and 1 millimeter.

2. A method of machining the Carbon—Carbon heat exchanger core of claim 1, the method comprising:
using at least one electrode to perform electrical discharge machining of the fluid passageways of the heat exchanger core, the electrode made of a material that is mechanically and chemically compatible with the core.

3. The method of claim 2, wherein an outer surface of the electrode is formed by a carbon-based material.

4. The method of claim 2, wherein the electrode is made of a material selected from a group consisting of carbide, graphite, carbon and tungsten.

5. The method of claim 2, wherein at least one electrode is scanned across the heat exchanger core to machine the fluid passageways.

6. The method of claim 2, wherein arrays of the electrodes are used to machine the fluid passageways.

7. The method of claim 2, wherein the electrode has a shape of a portion to be removed from the work piece.

8. The method of claim 2, further comprising causing local surface oxidation of the heat exchanger core during machining.

9. The method of claim 8, wherein the local oxidation is caused by supplying an oxidizing dielectric to the heat exchanger core.

10. The method of claim 8, wherein the electrode is used to direct a dielectric onto the heat exchanger core to cause the local surface oxidation.

11. A work-piece, comprising: a carbon—carbon composite material having machined features formed therein,
   wherein the work-piece comprises a heat exchanger core,
   wherein the machined features have dimensions between 0.1 millimeters and 1 millimeter, and
   wherein the machined features are formed by electrical discharge from at least one electrode to effect vaporization removal of a portion of the carbon—carbon composite material from the work-piece.

12. The work-piece of claim 11, wherein the machined features have the shape of a negative replica of the at least one electrode.

13. The work-piece of claim 11, wherein:
   the work-piece includes carbon deposited from pyrolysis of a dielectric fluid,
   the carbon is deposited within the machined features, and
   the dielectric fluid is delivered to the machined features via the at least one electrode.

14. The work-piece of claim 13, wherein the dielectric fluid comprises a hydrocarbon.

* * * * *